United States Patent [19]
Xia et al.

[11] Patent Number: 6,037,306
[45] Date of Patent: Mar. 14, 2000

[54] CATALYST CONTAINING MOLYBDENUM AND/OR TUNGSTEN FOR HYDROTREATING LIGHT OIL DISTILLATES AND PREPARATION METHOD THEREOF

[75] Inventors: Guofu Xia; Mei Zhu; Enze Min; Yahua Shi; Mingfeng Li; Hong Nie; Zhiping Tao; Haitao Huang; Runqiang Zhang; Jian Li; Zhishan Wang; Guopeng Ran, all of Beijing, China

[73] Assignees: China Petrochemical Corporation; Research Institute of Petroleum Processing, Sinopec, both of Beijing, China

[21] Appl. No.: 09/272,555

[22] Filed: Mar. 19, 1999

[30] Foreign Application Priority Data

Mar. 20, 1998 [CN] China .................................. 98100765

[51] Int. Cl.⁷ .............................. B01J 23/76; B01J 23/75; B01J 23/755
[52] U.S. Cl. ........................ 502/315; 502/208; 502/211; 502/305; 502/313; 502/314; 502/321
[58] Field of Search ................................. 502/305, 313, 502/314, 315, 321, 208, 211

[56] References Cited

U.S. PATENT DOCUMENTS 4,717,707  1/1988  Kemp ................................. 502/211
4,880,524  11/1989  Kemp ................................. 502/211

FOREIGN PATENT DOCUMENTS

| | | |
|---|---|---|
| 85104438A | 6/1985 | China . |
| 1040610A | 3/1990 | China . |
| 1085934A | 10/1992 | China . |
| 1105053A | 7/1995 | China . |
| 1123310A | 5/1996 | China . |
| 1169337A | 1/1998 | China . |

*Primary Examiner*—John F. Niebling
*Assistant Examiner*—Alexander G. Ghyka
*Attorney, Agent, or Firm*—Birch, Stewart, Kolasch, & Birch, LLP

[57] ABSTRACT

A hydrotreating catalyst containing molybdenum and/or tungsten for light oil distillates, said catalyst contains tungsten oxide and/or moybdenum oxide, nickel oxide and cobalt oxide supported on an alumina carrier, the content of said tungsten oxide and/or molybdenum oxide is from 4 wt % to less than 10 wt %, the content of nickel oxide 1~5 wt %, the content of cobalt oxide 0.01~1 wt %, the atom ratio of nickel-cobalt to nickel, cobalt-tungsten and/or molybdenum is 0.3~0.9. Compared with the prior art, the catalyst has lower metal content, but higher activity at low-temperature. The catalyst is especially suitable for use in the hydrodemercaptanization process of light oil distillates.

16 Claims, No Drawings

CATALYST CONTAINING MOLYBDENUM AND/OR TUNGSTEN FOR HYDROTREATING LIGHT OIL DISTILLATES AND PREPARATION METHOD THEREOF

This invention relates to a hydrotreating catalyst containing oxides or hydroxides of chromium, molybdenum or tungsten and a preparation method thereof, more particularly, relates to a catalyst containing oxides or hydroxides of molybdenum and/or tungsten used for hydrotreating light oil distillates and a preparation method thereof. The total sulfur content, mercaptan content and acid value of light oil distillates are important quality indexes. The total sulfur content of some light oil distillates such as lamp kerosene, aviation kerosene and FCC gasoline is qualified or nearly qualified, only the mercaptan content and acid value are not. The presence of mercaptan makes an oil product not only give off a foul smell, but also its quality and stability descend, and moreover, mercaptan itself is corrosive. Therefore, in petroleum processing, it is necessary to remove mercaptan from light oil distillates or convert it into the less detrimental sulfur dioxide.

At present, the deodorization methods of oil products can be classified industrially into three kinds as follows:

1. Acid-base electrochemical refining process: in this process, there are some deficiencies of high consumption of acid and base, environmental pollution caused by acid and base residues, corrosion to apparatus and the product color being not stable enough;
2. Deodorization by oxidation: this process is called the Merox process, in which a catalyst of sulfonated phthalocyanine cobalt and an activator are used to oxidize mercaptan into sulfur dioxide, but the resultant product needs to be washed with water, dehydrated with salt, and then decolorized with clay. Although these operations are carried out under pressure, new pollution still occurs from waste salts and clay. Besides, there is a rigid limitation on the acid value of the feedstocks in this process, so the adaptability of this process to feedstocks is not good.
3. Hydrofining process: common hydrofining catalyst and apparatus are in general used in this process. The process has the advantages of high flexibility in operation and stable and reliable product quality. However, there are also some defects of high investment and high cost in operation.

In the hydrofining process the hydrogenation catalysts play an important role in hydrogenation. First of all, the catalyst cost is of direct importance to the operation cost of the whole hydrogenation process. Therefore, the catalyst having higher activity for hydrodemercaptanization and deacidification at a lower cost should be used during treatment of qualified or nearly qualified middle fractions from which only mercaptan and acidic substances are required to be removed. In addition, to reduce investment and operation cost for the hydrofining process, the low-temperature (150~200° C.) activity of catalyst is of vital significance, because a catalyst having higher activity at low temperature can not only diminish energy consumption in the hydrofining process, but also exert an immediate effect upon the technological process per se. For example, the first side-line kerosene (i.e. a reaction feedstock used in the present invention) is generally at about 160~180° C. temperature while it is just distilled out from a thermal distillation unit; when hydrofining reaction is carried out at a temperature below 200° C. to remove mercaptan, this feedstock can be heated to the reaction temperature by passing through only a simple heat exchanger, and steam of medium pressure (15 kg/cm$^2$) can be used as a heating medium, or even the feedstock can be fed directly into the hydrodemercaptanization apparatus without any heat exchanger. When the reaction temperature of the hydrofining process is up to 240° C. or higher, steam with higher vapor pressure (up to 35 kg/cm$^2$) must be used as a heat-exchanging medium so that the feedstock can be heated to the required reaction temperature.

CN 85 104 438 B discloses a catalyst containing tungsten and nickel supported on a fluorine-containing alumina for hydrofining of fraction oils, wherein said catalyst is prepared by the following steps: alkoxylaluminum or alkylaluminum is hydrolyzed to obtain boehmite with purity higher than 65 wt %, which is then calcined at 500~700° C. to obtain γ-alumina, and impregnated with fluorine compound to obtain fluorine-containing alumina, then the oxides of tungsten and nickel are supported homogeneously on the fluorine-containing alumina by co-impregnation technique to obtain the catalyst which has a composition of 1~5 wt % nickel oxide, 12~35 wt % of tungsten oxide and 1~9 wt % of fluorine. The metal content of the catalyst is so high that the cost is relatively high. The catalyst is suitable for hydrofining of fraction oils, namely for desulfurization and denitrogenation, but pre-sulfurization treatment of the catalyst is needed before use.

In CN1,085,934 A, a catalyst for hydrofining of petroleum wax is disclosed, wherein the catalyst comprises magnesium oxide, nickel oxide, tungsten oxide and alumina, having a composition of 0.1~1.9 wt % magnesium oxide, 2.5~6.0 wt % nickel oxide, and 24.0~34.0 wt % tungsten oxide. The catalyst is suitable for hydrofining of heavier petroleum fractions, particularly petroleum wax fractions. The catalyst has relatively high of hydrogenation activity, but its metal content is relatively high, and so is its cost. The pre-sulfurization treatment of the catalyst is also needed before use. In CN 1,105,053A, a catalyst for hydrofining fractions is disclosed, wherein the catalyst comprises a carrier which is made by calcining a precursor of alumina under atmosphere of air and steam mixture at high temperature, a fluorine promoter and the active constituents of nickel and tungsten. The contents of various components are respectively 1~9% of fluorine, 1~5% of nickel oxide, 15~38% of tungsten oxide and the balance of the carrier by weight based on the catalyst. The catalyst is suitable for hydrogenation process of heavy fraction oils with higher hydrogenation activity, but its metal content is also relatively high and the carrier needs to be calcined under atmosphere of air and steam mixture at high temperature, so the preparation process is complicated, thus the cost is also high. The pre-sulfurization treatment of the catalyst is also needed before use.

In CN 1,123,310A, a catalyst comprising γ-alumina as a carrier and cobalt-molybdenum as active constituents for hydrodesulfurization of hydrocarbons is disclosed, wherein said carrier is modified with zinc oxide and impregnated with a solution containing cobalt and molybdenum by co-impregnation method. The catalyst composition comprises ZnO 1~15%, MoO$_3$ 5~18%, and CoO 1~10% by weight. The pre-sulfurization treatment of the catalyst is also needed before use.

In CN 1,040,610A, a hydrodesulfurization catalyst for hydrocarbons is disclosed, wherein the catalyst comprises a γ-alumina containing titanium oxide as a carrier and molybdenum, cobalt and nickel as active constituents. The content of titanium oxide in the γ-alumina carrier is 5~30 wt %. In the catalyst the content of $MoO_3$ is 5~20 wt %, more preferably 10~15 wt %, the content of CoO is 110 wt %, the content of NiO is 2~10 wt %. The catalyst can be used for hydrodesulfurizing petroleum fractions with a distillation range of 80~200° C. and sulfur content of 1~300 ppm. Although pre-sulfurization of the catalyst is not necessary, the catalyst needs be reduced at a temperature of 230~300° C. under a hydrogen pressure of 50 $Kg/cm^2$ before use.

In U.S. Pat. No. 4,880,524, a process for hydrotreating hydrocarbon feedstocks is disclosed, wherein the hydrotreating process is carried out under a pressure of 13.6~238 $kg/cm^2$ at 149~482° C. by contacting the hydrocarbon feedstock with a catalyst, wherein said catalyst has a specific surface area of at least 300 $m^2/g$, with the pore volume of pores having a diameter of less than 70 Angstrom constituting at least 70% of the total pore volume. Said catalyst is prepared by a specific method. The catalyst comprises 1~6 wt % of nickel (1.27~7.62 wt %, based on nickel oxide), 8~22 wt % of molybdenum (12~35 wt %, based on molybdenum oxide), or 10~40 wt % of tungsten (12.6~50.4 wt %, based on tungsten oxide), or 8~40 wt % of the mixture of molybdenum and tungsten. The metal content of the catalyst is relatively high and the preparation process is more complicated.

In CN 1,169,337 A, a catalyst for hydrotreating fraction oils is disclosed, wherein the catalyst contains tungsten, nickel and cobalt supported on γ-alumina carrier in the amounts of respectively 10~30 wt % tungsten, 1~7 wt % nickel and 0.01~1 wt % cobalt, based on oxides. The catalyst is prepared by co-impregnation technique with an aqueous solution of tungsten, nickel and cobalt compounds. The pre-sulfurization treatment of the catalyst is needed before use, and there is also the same defect of relatively high metal content in the catalyst.

Furthermore, all the catalysts mentioned above have a fatal drawback, that is, their low-temperature activity is inferior.

The object of the present invention is to provide a hydrotreating catalyst, which has lower metal content, lower cost and superior low-temperature activity, for hydrotreating of light oils, and a method for preparation of the same.

In prior art of hydrotreating catalysts, as mentioned above, the catalysts generally have lower activity at low-temperature and most of the catalysts also have higher metal content and higher cost. The inventors of the present invention discovered unexpectedly that while metal content of the catalyst is decreased, the desulfurization activity at low-temperature can be significantly increased by introducing three active constituents of nickel, cobalt and molybdenum and/or tungsten onto the alumina carrier of the catalyst and by adjusting of the ratios of the three active constituents to each other. Especially, the desulfurization activity at low-temperature can be further increased by a specific method for preparation of the catalyst.

The catalyst provided according to the present invention contains tungsten oxide and/or molybdenum oxide, nickel oxide and cobalt oxide supported on the alumina carrier, in the amounts of respectively tungsten oxide and /or molybdenum oxide 4 wt % to less than 10 wt %, nickel oxide 1~5 wt %, cobalt oxide 0.01~1 wt %, and the ratio of total atom number of nickel and cobalt to total atom number of nickel, cobalt, tungsten and/or molybdenum is 0.3~0.9.

The preparation method of the catalyst according to the invention comprises that the alumina carrier is impregnated with an aqueous solution containing molybdenum and/or tungsten compounds and a nickel compound and an aqueous solution containing a cobalt compound, and the alumina carrier impregnated with molybdenum and/or tungsten, nickel and cobalt is calcined, wherein said impregnation process of the alumina carrier with the aqueous solution containing cobalt compound and said impregnation process of the alumina carrier with the aqueous solution containing molybdenum and/or tungsten compounds and nickel compound are carried out separately. Said impregnation process of the alumina carrier with the aqueous solution of the cobalt compound is carried out after the alumina carrier has been impregnated with the aqueous solution containing molybdenum and/or tungsten compounds and nickel compound and calcined. Said calcination of the alumina carrier impregnated with the aqueous solution of cobalt compound is carried out at a temperature of 50~300° C. for more than 1 hour.

In the catalyst according to the invention, the content of nickel oxide is preferably 2~4 wt %. The content of cobalt oxide is preferably 0.02~0.5 wt %. The content of tungsten oxide and/or molybdenum oxide is preferably 4.5~9 wt %, and said ratio of total atom number of nickel and cobalt to total atom number of nickel, cobalt, tungsten and/or molybdenum is preferably 0.4~0.7.

The catalyst according to the present invention may comprise further and preferably a promoter. Said promoter can be one or more compounds selected from fluorine-containing compounds, the oxides of magnesium or the oxides of phosphorus, and the content of said promoter is 0.01~8 wt %, preferably 0.2~5 wt %, based on element.

Said alumina carrier is an alumina commonly used as a carrier of hydrogenation catalysts, preferably γ-alumina, η-alumina or mixture thereof. More preferably, the alumina carrier is γ-alumina or an alumina consisting essentially of γ-alumina.

Although the catalyst according to the invention may be pre-sulfurized before use, it is preferably not presulfurized. The catalyst in oxidation state can be directly used to start operation.

The catalyst according to the present invention can be prepared by co-impregnation technique, that is, the alumina carrier is co-impregnated with an aqueous solution of molybdenum-containing compounds and/or tungsten-containing compounds, nickel-containing compounds and cobalt-containing compounds, and then is calcined to obtain the catalyst.

The preferred preparation method of the catalyst according to the invention comprises impregnating the alumina carrier with an aqueous solution containing molybdenum and/or tungsten compounds and a nickel compound and an aqueous solution containing cobalt compound, and calcining the alumina carrier impregnated with molybdenum and/or tungsten, nickel and cobalt, wherein said impregnation process of alumina carrier with the aqueous solution containing cobalt compound and said impregnation process of the alumina carrier with the aqueous solution containing tungsten and/or molybdenum compounds and nickel compound are carried out separately. Said Impregnation process of alumina carrier with the aqueous solution containing cobalt compound is carried out after the alumina carrier has been impregnated with the aqueous solution of molybdenum and/or tungsten compounds and nickel compound and calcined. Said calcination of the alumina carrier impregnated with the aqueous solution containing cobalt compound is carried out at a temperature of 50~300° C. for more than 1 hour. The catalyst's low-temperature activity will be further enhanced by this method.

In detail, the preferred preparation method of the catalyst according to the present invention comprises the following steps:

(1). A precursor of alumina is shaped, dried, and then calcined at 500~700° C. in the presence of air or steam for (2~6 hours to obtain an alumina carrier;

(2). The resultant alumina carrier from step (1) is impregnated with an aqueous solution containing molybdenum and/or tungsten and nickel compounds, then dried and calcined. The amount of molybdenum and/or tungsten and nickel compounds used should be enough to give a final catalyst comprising 4 wt % to less than 10 wt %, preferably 4.5~9 wt % of tungsten oxide and/or molybdenum oxide, and 1~5 wt %, preferably 2~4 wt % of nickel oxide;

(3). The resultant product from step (2) is impregnated with an aqueous solution containing cobalt compound, then calcined at 50~300° C., preferably 150~250° C. for more than 1 hour, preferably for 2~4 hours, wherein the amount of cobalt compound used should be enough to give a final catalyst comprising 0.01~1 wt %, preferably 0.02~0.5 wt % of cobalt oxide.

Said precursor of alumina is selected from various hydrated alumina, such as pseudo-boehmite, gibbsite and the like, which can be calcined to form γ-alumina and/or η-alumina. Said precursor of alumina is preferably pseudo-boehmite or one or more hydrated alumina consisting essentially of pseudo-boehmite.

Wherein said drying and calcination of the alumina carrier impregnated with the aqueous solution containing molybdenum and/or tungsten and nickel compounds are carried out under conventional conditions. For example, the drying temperature may range from normal temperature to 200° C., the calcination temperature may range from 400° C. to 600° C., and the drying time may be more than 1 hour, preferably 2~5 hours.

An ordinary impregnation or saturation impregnation method can be used in said impregnation step, but the saturation impregnation method is preferred. After the impregnation with an aqueous solution containing cobalt compound, said calcination is preferably carried out at a temperature in the range from 150° C. to 250° C. for a calcination time of 2~4 hours.

Said tungsten and/or molybdenum compounds are selected from their water-soluble compounds, preferably ammonium tungstate, ammonium metatungstate and/or ammonium molybdate. Said nickel compounds are selected from their water soluble nitrate, acetate, carbonate, basic carbonate, preferably nickel nitrate and/or nickel acetate. Said cobalt compounds are selected from their water-soluble nitrate, acetate, carbonate and basic carbonate, preferably cobalt nitrate and/or cobalt acetate.

The preparation method of the catalyst provided according to the present Invention can also comprise a step of impregnating said alumina carrier with an aqueous solution of one or more magnesium-containing compounds, phosphorus-containing compounds or fluorine-containing compounds, wherein said impregnation is carried out before the alumina carrier is impregnated with the aqueous solution containing molybdenum and/or tungsten and nickel compounds; after the impregnation, the resultant carrier is then dried and calcined. The conditions for drying and calcination are the same as those for drying and calcination after impregnation with molybdenum and/or tungsten. The amount of said magnesium, phosphorus and fluorine compounds and their water solution used should be enough to give a final catalyst which comprises 0.01~8 wt %, preferably 0.2~5 wt %, of magnesium, phosphorus and/or fluorine, based on element.

The magnesium, phosphorus and/or fluorine compounds can be one or more compounds selected from their water soluble compounds, wherein the magnesium compound is preferably magnesium nitrate, the fluorine compound is preferably ammonium fluoride and/or fluorhydric acid, and the phosphorous compound is preferably one or more kinds of compounds selected from phosphoric acid, ammonium phosphate and ammonium hydrogen phosphate, ammonium dihydrogen phosphate.

The catalyst provided according to the present invention can be used in hydrofining of light oil distillates such as gasoline distillates and middle fraction oils, especially suitable for hydrodemercaptanization and deacidification of FCC gasoline with distillation range of 35~210° C. and kerosene fractions with distillation range of 130~290° C. The operation conditions can be adjusted according to the properties of feedstocks and the quality requirements of product in the following range: reaction temperature of 149~315° C., volume space velocity of 2~8 $h^{-1}$, hydrogen partial pressure of 0.3~2.0 MPa and $H_2$/oil volume ratio higher than 5. Hydrogen used in the hydrofining may be fresh industrial hydrogen (hydrogen purity of 85~100%), hydrogen released from industrial process (hydrogen purity of 50~85%), and hydrogen released from ammonia synthesis process and so on. In brief, there are no special limitation on the purity of hydrogen, only if the oxygen content in hydrogen is ≦5 ppm, $H_2S$ content ≦2.0 wt %, so that the resource of hydrogen is augmented greatly, and the utilization efficiency of hydrogen can be increased. Since the catalyst according to the present invention has excellent low-temperature activity, it is particularly suitable for use in the hydrodemercaptanization and deacidification mentioned above of FCC gasoline and kerosene fractions at a reaction temperature of 150~200° C.

The catalyst according to the invention maintains at higher reaction temperature (higher than 200° C.) its performance of demercaptanization and deacidification of light oils on the same level as that of the hydrogenation catalyst having higher metal content of the prior art, even though its active metal content and production cost are reduced significantly.

Especially, it is unexpected that, compared with previous catalyst having higher metal content, the catalyst provided according to the present invention has higher catalytic activity at lower reaction temperature(149~200° C.).

For example, when a catalyst provided according to the present invention comprising 0.05~0.25 wt % of cobalt oxide, 2.05~3.51 wt % of nickel oxide and 6.06~8.50 wt % of tungsten oxide or molybdenum oxide is used for hydrodemercaptanization of an aviation kerosene having distillation range of 161~220° C., sulfur content of 2170 ppm, mercaptan sulfur content of 128 ppm, acid value of 0.039 mg KOH/g under the conditions as follows: hydrogen partial pressure 0.7 MPa, LSHV $4h^{-1}$, $H_2$/oil volume ratio 25, when the reaction temperature is at 180° C., the mercaptan sulfur content in the reaction product is decreased to 8~16 ppm, the acid value decreased to zero, and the total sulfur content decreased to 1977~1995 ppm; when the reaction temperature is at 200° C., the mercaptan sulfur content in the reaction product is decreased to 6~15 ppm, the acid value decreased to zero, and total sulfur content decreased to 1962~1980 ppm; when the reaction temperature is at 220° C., the mercaptan sulfur content in the reaction product is decreased to 4~9 ppm, the acid value is decreased to zero, and the total sulfur content is decreased to 1950~1968 ppm; the products meet the quality indexes of #3 aviation fuel, especially, wherein the catalyst prepared by a method of post-impregnation with cobalt has much higher low-temperature activity furthermore, a catalyst prepared by post-impregnation with cobalt and at same time containing a promoter of magnesium, phosphorus or fluorine is one having the highest activity of them.

However, for a commercial catalyst comprising 0.05 wt % of cobalt oxide, 2.4 wt % of nickel oxide, 20 wt % of tungsten oxide, 0.8 wt % of promoter magnesium, and a ratio of the atom number of nickel and cobalt to the total atom number of nickel, cobalt and tungsten of 0.27, and a commercial catalyst comprising 0.09 wt % of cobalt oxide, 2.5 wt % of nickel oxide, 22.6 wt % of tungsten oxide, 1 wt % of promoter magnesium, and a ratio of the atom number of nickel and cobalt to the total atom number of nickel, cobalt and tungsten of 0.27, and the highest activity catalyst disclosed in CN 1,169,337A comprising 6.5 wt % of nickel oxide, 19.5 wt % of molybdenum oxide, 0.49 wt % of promoter potassium and a ratio of the atom number of nickel and cobalt to the total atom number of nickel, cobalt and tungsten of 0.26, when the other reaction conditions are the same, when the reaction is carried out at a temperature of 180° C., the mercaptan sulfur content, acid value and total sulfur content of the products are respectively up to 28~31 ppm, 0.017~0.019 mg KOH/g and 2043~2062 ppm; when the reaction is carried out at a temperature of 200° C., the mercaptan sulfur content of products is up to 23~25 ppm, the sulfur content is up to 2020~2023 ppm; all the products can not meet the quality requirements of #3 aviation fuel. When a reference catalyst of dual components comprising 3.62 wt % of nickel oxide, 8.53 wt % of tungsten oxide and total atom ratio of nickel to nickel plus tungsten of 0.6 is used under the same other conditions, when the reaction is carried out at a temperature of 180° C., the mercaptan sulfur content, acid value and sulfur content of the product are respectively up to 38 ppm, 0.025 mg KOH/g and 2100 ppm; when the reaction is carried out at a temperature of 200° C., the mercaptan sulfur content of the product is up to 28 ppm, the sulfur content is up to 2059 ppm; all these products cannot meet the quality requirements of #3 aviation fuel.

The present invention is further illustrated by the following non-limiting examples.

EXAMPLE 1

This example is used to illustrate the preparation of the catalyst carrier provided according to the invention.

Proper amount of extruding promoter and water were added to 5000 g of aluminum hydroxide A powder (solid content of 70 wt %, and pseudo-boehmite content of 85 wt %, from the Shandong Aluminum Plant), then mixed, and the resultant mixture was extruded into trilobular bars of circumscribed circle diameter of 1.6 mm, then dried at 120° C. for 2 hours, and calcined at 600° C. for 4 hours, the length of the resultant bars was cut into 2~3 mm to obtain a carrier $Z_1$. The specific surface area and pore volume of said carrier $Z_1$ are shown in Table 1. The specific surface area and pore volume were measured by BET method of nitrogen adsorption at low temperature (the same below).

EXAMPLE 2

This example is used to illustrate the preparation of the catalyst carrier provided according to the invention.

500 g of aluminum hydroxide A powder (solid content 70 wt % pseudo-boehmite content of 85 wt %, from the Shandong Aluminum Plant) as said in Example 1 and 500 g of aluminum hydroxide B powder (solid content of 70 wt %, pseudo-boehmite content of 70 wt %, from the Catalyst Factory of the Changling Refinery) were mixed homogeneously, and a proper amount of extruding promoter and water were added to the mixture resultant mixture was extruded into trilobular bars of circumscribed circle diameter of 1.6 mm, then dried at 120° C. for 2 hours, calcined at 600° C. for 4 hours. The length of the resultant bars were cut into 2~3 mm to obtain a carrier $Z_2$. The specific surface area and pore volume of the carrier $Z_2$ are shown in the Table 1.

TABLE 1

| Example No. | 1 | 2 | 3 | 4 | 5 |
|---|---|---|---|---|---|
| Carrier No. | $Z_1$ | $Z_2$ | $Z_3$ | $Z_4$ | $Z_5$ |
| Promoter type | / | / | Mg | F | P |
| Promoter content, wt % | 0 | 0 | 0.93 | 3.5 | 2.0 |
| Specific surface area, $M^2$/g | 278 | 283 | 275 | 270 | 272 |
| Pore volume, ml/g | 0.40 | 0.45 | 0.38 | 0.37 | 0.38 |

EXAMPLES 3~5

The following examples are used to illustrate the preparation of the catalyst carrier containing promoter components according to the invention.

Deionized water was added to 49.0 g of magnesium nitrate ($Mg(NO_3)_2 \cdot 6H_2O$) to prepare an aqueous magnesium nitrate solution of 325 ml, 500 g of carrier $Z_1$ was impregnated with the magnesium nitrate solution, then dried at 120° C. for 2 hours, calcined at 550° C. for 4 hours, a carrier $Z_3$ was obtained.

By using the same procedures, 37.5 g of ammonium fluoride ($NH_4F$) and 75 ml of phosphoric acid (with a concentration of 85.6 wt %) were taken respectively, deionized water was added separately to them to prepare an aqueous ammonium fluoride solution of 325 ml and an aqueous phosphoric acid solution of 330 ml. Two part of 500 g of the carrier $Z_1$ were impregnated separately with the respectively prepared ammonium fluoride solution and phosphoric acid solution, then dried at 120° C. for 2 hours and calcined at 550° C. for 4 hours to obtain the fluorine-containing carrier $Z_4$ and the phosphorus-containing carrier $Z_5$. The promoter content (based on element) and specific surface area and pore volume of carriers $Z_3$~$Z_5$ are shown in Table 1. The content of phosphorus, magnesium and fluorine were measured by X-ray fluorescence spectroscopy.

EXAMPLES 6~12

The catalysts provided according to the invention and preparation thereof.

(1). A given amount of nickel nitrate $[Ni(NO_3)_2 \cdot 6H_2O]$ and ammonium molybdate $[(NH_4)_6Mo_7O_{24} \cdot 4H_2O]$ or an ammonium metatungstate solution (called briefly as AMT solution with concentration of 77.6 g $WO_3$/100 m sol.) were mixed, then deionized water was added to prepare 96 ml of aqueous solution containing nickel nitrate and ammonium molybdate or ammonium metatungstate. Each 150 g of carriers $Z_1$ to $Z_5$ was impregnated respectively with the solution prepared above for 4 hours, then dried at 120° C. for 2 hours, and calcined at 450° C. for 4 hours, respectively. The amounts of various substances used are shown in Table 2.

(2). Several parts of a given amount of cobalt nitrate $[Co(NO_3)_2 \cdot 6H_2O]$ were taken respectively, and deionized water was added to them respectively to prepare cobalt nitrate solutions each of 94 ml., the resultant products from step (1) were impregnated separately with the cobalt nitrate solution, then calcined at 180~230° C. for 3 hours respectively, and the catalysts $C_1$~$C_7$ provided according to the invention were obtained. The amount of cobalt nitrate used, calcination temperature and the content of various components of the catalysts $C_1 \sim C_7$ are shown in Table 2, wherein the contents of cobalt, nickel, molybdenum, tungsten, magnesium, fluorine and phosphorus were analyzed by using X-ray fluorescence spectroscopy.

TABLE 2

| Example No. | 6 | 7 | 8 | 9 | 10 | 11 | 12 |
|---|---|---|---|---|---|---|---|
| Catalyst No. | $C_1$ | $C_2$ | $C_3$ | $C_4$ | $C_5$ | $C_6$ | $C_7$ |
| Carrier No. | $Z_1$ | $Z_1$ | $Z_2$ | $Z_3$ | $Z_4$ | $Z_5$ | $Z_1$ |
| Preparation of catalyst | | | | | | | |
| Amount of nickel nitrate used, g | 15.60 | 13.25 | 15.90 | 17.80 | 16.50 | 16.60 | 23.40 |
| Amount of ammonium molybdate used, g | | | 20.50 | | | | |
| Amount of AMT solution used, ml | 16.40 | 13.50 | | 13.00 | 16.70 | 16.50 | 18.70 |
| Amount of cobalt nitrate used, g | 0.40 | 0.65 | 0.95 | 0.98 | 1.58 | 1.15 | 0.69 |
| Temperature of calcination, ° C. | 180 | 200 | 230 | 200 | 210 | 180 | 230 |
| Analysis of the catalysts | | | | | | | |
| CoO, wt % | 0.05 | 0.10 | 0.15 | 0.16 | 0.25 | 0.18 | 0.10 |
| NiO, wt % | 2.40 | 2.05 | 3.25 | 2.79 | 2.50 | 2.57 | 3.51 |
| $WO_3$, wt % | 7.65 | 6.34 | | 6.06 | 7.68 | 7.63 | 8.50 |
| $MoO_3$, wt % | | | 7.38 | | | | |
| Atomic ratio of Ni + Co/ NI + Co + W or Mo | 0.50 | 0.51 | 0.46 | 0.60 | 0.53 | 0.53 | 0.56 |
| Promoter | | | | | | | |
| Type | | | | | Mg | F | P |
| Content, wt % | | | | | 0.76 | 2.67 | 1.53 |

Comparative Example 1

18.80 ml of said AMT solution mentioned in the examples 6~12 were added to and then mixed with 24.25 g of nickel nitrate [$Ni(NO_3)_2 \cdot 6H_2O$], and deionized water was added to prepare 94 ml of solution containing nickel nitrate and ammonium metatungstate. 150 g of the carrier $Z_1$ was impregnated with the solution prepared above for 4 hours, then dried at 120° C. for 2 hours and calcined at 450° C. for 4 hours, to obtain a reference catalyst numbered as $C_8$.

The catalyst $C_8$ contained 3.62 wt % of nickel oxide, 8.53 wt % of tungsten oxide and had an atom ratio of nickel to nickel plus tungsten of 0.56.

EXAMPLE 13

The catalyst provided according to the invention and preparation thereof

This catalyst was prepared according to the amount of various substances and method as used in Example 9, except that the alumina carrier was co-impregnated with 95 ml of mixed aqueous solution containing nickel nitrate and cobalt nitrate and AMT solution, then calcined at 450° C. for 4 hours, to obtain a catalyst numbered as $C_9$. The catalyst $C_9$ contained 0.16 wt % of cobalt oxide, 2.79 wt % of nickel oxide, 6.06 wt % of tungsten oxide, 0.76 wt % of magnesium, and had an atom ratio of nickel and cobalt to nickel, cobalt plus tungsten of 0.6.

EXAMPLES 14~21

The following examples show the activity of the catalyst according to the invention for hydrodemercaptanization and deacidification of light oil distillates.

The #1 aviation kerosene with distillation range of 161~220° C. shown in Table 3 as a feedstock was used to evaluate the activities of catalysts $C_1 \sim C_7$ and $C_9$ for demercaptanization and deacidification. The reaction was carried out in a 100 ml hydrogenation apparatus. The loading of catalyst was 50 ml, reaction conditions were as follows: reaction temperature 180° C., hydrogen partial pressure 0.7 MPa, LHSV $4.0h^{-1}$, and $H_2$/oil volume ratio 25. The properties of reaction products are shown in Table 5. Therein sulfur content was measured by microcoulometric method (SH/T 0253-9), mercaptan content was determined by potentiometric titration, acid value was measured by method of SH/T 0163-92 and chroma was measured by method GB 6540-86 (the same hereinafter).

TABLE 3

| Name of feedstock oil | Aviation kerosene | Aviation kerosene | Aviation kerosene | Aviation kerosene |
|---|---|---|---|---|
| Feedstock Oil No. | #1 | #2 | #3 | #4 |
| $D^{20}_4$, g/cm³ | 0.7916 | 0.7864 | 0.7818 | 0.7990 |
| Sulfur content, ppm | 2170 | 1470 | 1490 | 250 |
| Mercaptan sulfur content, ppm | 128 | 105 | 114 | 37 |
| Acid value, mg KOH/g | 0.039 | 0.031 | 0.031 | 0.029 |
| Chroma, No. | 19 | 20 | 22 | 18 |
| Distillation range, ° C. | | | | |
| Initial b.p. | 161 | 162 | 162 | 147 |
| 10% | 173 | 171 | 171 | 163 |
| 50% | 186 | 184 | 185 | 187 |
| 90% | 207 | 209 | 211 | 225 |
| End point | 220 | 228 | 220 | 242 |

TABLE 5

| Example No. | 14 | 15 | 16 | 17 | 18 | 19 | 20 | 21 |
|---|---|---|---|---|---|---|---|---|
| Catalyst No. | $C_1$ | $C_2$ | $C_3$ | $C_4$ | $C_5$ | $C_6$ | $C_7$ | $C_9$ |
| Mercaptan sulfur content of product, ppm | 13 | 12 | 12 | 9 | 8 | 9 | 13 | 16 |
| Total sulfur content of product, ppm | 1985 | 1978 | 1979 | 1977 | 1978 | 1981 | 1990 | 1995 |
| Acid value of product, mg KOH/g | 0 | 0 | 0 | 0 | 0 | 0 | 0 | 0 |
| Chroma, No. | 27 | 27 | 27 | 27 | 27 | 27 | 27 | 27 |

Comparative Examples 2~6

The following comparative examples show the activities of existing catalysts for hydrodemercaptanization and deacidification of light oil distillates, metal contents of these catalysts were much higher than that of the catalysts provided according to the present invention.

The catalyst activity was evaluated according to the procedures of Examples 14~21, except that the catalysts used were the reference catalyst $C_8$, a commercial catalyst CH-17 (available from the Catalysts factory of the Changling Refinery), a commercial catalyst CH-18 (available from the Catalysts Factory of the Changling Refinery), a catalyst D prepared by example 7 of CN 1,169,337 A (which is one having the highest activity among them), and a deactivated catalyst CH-18 from the pre-hydroreforming unit (said pre-hydroreforming process was operated at a reaction temperature of 300° C. and a reaction pressure of 2 MPa). The CH-17, CH-18, the catalyst D prepared by Example 7 of CN 1,169,337A and the deactivated catalyst CH-18 from the pre-hydroreforming unit are numbered respectively and sequentially as $C_{10}$, $C_{11}$, $C_{12}$ and $C_{13}$. Their composition, atom ratio, specific surface area and pore volume are shown in Table 4, and properties of their products are shown in Table 6.

TABLE 4

| Catalyst No. | Specific surface, $m^2/g$ | Pore volume, ml/g | Composition of metal, wt % | Atom ratio Ni(Co) to Ni(Co),W(Mo) |
|---|---|---|---|---|
| $C_{10}$ | 230 | 0.40 | NiO:6.5 $MO_3$:19.5 K:0.49 | 0.39 |
| $C_{11}$ | 174 | 0.31 | CoO:0.05 NiO:2.40 $WO_3$:20.0 Mg:0.80 | 0.27 |
| $C_{12}$ | 170 | 0.30 | CoO:0.09 NiO:2.50 $WO_3$:22.6 Mg:1.0 | 0.26 |
| $C_{13}$ | 160 | 0.28 | CoO:0.04 NiO:2.10 $WO_3$:19.5 Mg:0.53 | 0.26 |

TABLE 6

| Example No. | Comp. Exp.2 | Comp. Exp.3 | Comp. Exp.4 | Comp. Exp.5 | Comp. Exp.6 |
|---|---|---|---|---|---|
| Catalyst No. | $C_8$ | $C_{10}$ | $C_{11}$ | $C_{12}$ | $C_{13}$ |
| Mercaptan sulfur content of product, ppm | 38 | 31 | 29 | 28 | 35 |
| Total sulfur content of product, ppm | 2100 | 2062 | 2048 | 2043 | 2068 |
| Acid value of product, mg KOH/g | 0.025 | 0.019 | 0.018 | 0.017 | 0.019 |
| Chroma, No. | 27 | 27 | 27 | 27 | 27 |

EXAMPLES 22~29

The following Examples show the activity of the catalyst according to the invention for hydrodemercaptanization and deacidification of light oil distillates.

The hydrodemercaptanization and deacidification activities of catalysts $C_1$~$C_7$ and $C_9$ were evaluated according to the procedures of EXAMPLES 14~21, except for the reaction temperature of 200° C. The properties of reaction products are shown in Table 7.

TABLE 7

| Example No. | 22 | 23 | 24 | 25 | 26 | 27 | 28 | 29 |
|---|---|---|---|---|---|---|---|---|
| Catalyst No. | $C_1$ | $C_2$ | $C_3$ | $C_4$ | $C_5$ | $C_6$ | $C_7$ | $C_9$ |
| Mercaptan sulfur content of product, ppm | 10 | 10 | 11 | 6 | 6 | 6 | 11 | 15 |
| Total sulfur content of product, ppm | 1965 | 1968 | 1970 | 1963 | 1964 | 1962 | 1973 | 1980 |
| Acid value of product, mg KOH/g | 0 | 0 | 0 | 0 | 0 | 0 | 0 | 0 |
| Chroma, No. | 28 | 28 | 28 | 28 | 28 | 28 | 28 | 28 |

Comparative Examples 7~11

The following comparative examples show the activities of the previous catalysts for hydrodemercaptanization and deacidification of light oil distillates, the metal contents of these catalysts were much higher than those of the catalysts provided according to the present invention.

The catalyst activities were evaluated according to the procedures of the examples 22~29, except that the catalysts used were the reference catalysts $C_8$, $C_{10}$, $C_{11}$, $C_{12}$ and $C_{13}$. The properties of reaction products are shown in Table 8.

TABLE 8

| Example No. | Comp. Exp.7 | Comp. Exp.8 | Comp. Exp.9 | Comp. Exp.10 | Comp. Exp.11 |
|---|---|---|---|---|---|
| Catalyst No. | $C_8$ | $C_{10}$ | $C_{11}$ | $C_{12}$ | $C_{13}$ |
| Mercaptan sulfur content of product, ppm | 28 | 25 | 24 | 23 | 25 |
| Total sulfur content of product, ppm | 2059 | 2023 | 2020 | 2020 | 2020 |
| Acid value of product, mg KOH/g | 0 | 0 | 0 | 0 | 0 |
| Chroma, No. | 27 | 27 | 27 | 27 | 27 |

EXAMPLES 30~37

The following Examples show the activity of the catalyst provided according to the present invention for hydrodemercaptanization and deacidification of light oil distillates.

The hydrodemercaptanization and deacidification activities of catalysts $C_1$~$C_7$ and $C_9$ were evaluated according to the procedures of Examples 14~21, except for the reaction temperature of 220° C. The properties of reaction products are shown in Table 9.

TABLE 9

| Example No. | 30 | 31 | 32 | 33 | 34 | 35 | 36 | 37 |
|---|---|---|---|---|---|---|---|---|
| Catalyst No. | $C_1$ | $C_2$ | $C_3$ | $C_4$ | $C_5$ | $C_6$ | $C_7$ | $C_9$ |
| Mercaptan sulfur content of product, ppm | 8 | 8 | 8 | 4 | 4 | 4 | 8 | 9 |
| Total sulfur content of product, ppm | 1959 | 1961 | 1960 | 1953 | 1950 | 1950 | 1957 | 1968 |
| Acid value of product, mg KOH/g | 0 | 0 | 0 | 0 | 0 | 0 | 0 | 0 |
| Chroma, No. | 28 | 28 | 28 | 28 | 28 | 28 | 28 | 28 |

Comparative Examples 12~16

The following comparative examples show the activities of previous catalysts for hydrodemercaptanization and deacidification of light oil distillates, the metal contents of these catalysts were much higher than those of the catalysts provided according to the present invention.

The catalyst activities were evaluated according to the procedures of the examples 30~37, except that the catalysts used were the reference catalyst $C_8$, $C_{10}$, $C_{11}$, $C_{12}$ and $C_{13}$. The properties of reaction products are shown in Table 10.

TABLE 10

| Example, No. | Comp. Exp.12 | Comp. Exp.13 | Comp. Exp.14 | Comp. Exp.15 | Comp. Exp.16 |
|---|---|---|---|---|---|
| Catalyst, No. | $C_8$ | $C_{10}$ | $C_{11}$ | $C_{12}$ | $C_{13}$ |
| Mercaptan sulfur content of product, ppm | 13 | 9 | 8 | 8 | 9 |
| Total sulfur content of product, ppm | 2033 | 2010 | 2008 | 2005 | 2020 |
| Acid value of product, mg KOH/g | 0 | 0 | 0 | 0 | 0 |
| Chroma, No. | 27 | 28 | 28 | 28 | 27 |

It can be seen from the results shown in Tables 5~10 that:
(1) When reactions were carried out at 220° C. with the catalysts provided according to the present invention, of which the metal contents were much lower than those of reference catalysts, and under the same other process conditions, the mercaptan contents and acid values of the products were comparable to those of the reference catalysts, and the products met the quality requirements for #3 jet fuel (the mercaptan sulfur contents in products were not higher than 20 ppm, acid values were not higher than 0.015 mg KOH/g, the total sulfur contents were not higher than 2000 ppm), the colour of products were obviously improved. But for reference catalysts, the total sulfur contents of products were slightly higher. (2). When the reactions were carried out at 180 and 200° C. under the same other conditions with the catalysts provided according to the present invention, the products obtained met the quality requirements for #3 jet fuel, the colour of products were obviously improved. Their demercaptanization activities and deacidification activities were all obviously higher than those of reference catalysts. But for reference catalysts, at least one of the mercaptan content, acid value and sulfur content of the products failed to meet the quality requirements for #3 jet fuel. (3). When the reaction temperature was lowered, the demercaptanization activities of the catalysts according to the present invention diminished very slowly, but for reference catalysts, the demercaptanization activities diminished very obviously. The above results show that the catalyst provided according to the present invention has superior low-temperature activity, which is not matchable by any existing technique in the art.

EXAMPLES 38~40

The following Examples show the activity of the catalyst provided according to the present invention for hydrodemercaptanization and deacidification of light oil distillates.

The hydrodemercaptanization and deacidification activity of catalyst $C_1$ was evaluated with the same feedstock oil according to the procedures and conditions of Example 22, except for different reaction pressures and $H_2$/oil volume ratios. The properties of reaction products obtained at a $H_2$/oil volume ratio of 30 under different pressures are shown in Table 11.

TABLE 11

| Example No. | 38 | 39 | 40 |
| --- | --- | --- | --- |
| Reaction pressure, MPa | 0.3 | 0.7 | 1.5 |
| $H_2$/Oil volume Ratio | 30 | 30 | 30 |
| Mercaptan sulfur content of product, ppm | 7 | 9 | 13 |
| Acid value of product, mg KOH/g | 0 | 0 | 0 |

EXAMPLES 41~43

The following Examples show the activity of the catalyst provided according to the present invention for hydrodemercaptanization and deacidification of light oil distillates.

The hydrodemercaptanization and deacidification activity of catalyst $C_1$ was evaluated with the same feedstocks according to the procedures and conditions of Example 22, except for different space velocities and $H_2$/oil volume ratios. The properties of reaction products obtained in a $H_2$/oil volume ratio of 30 under different space velocities are shown in Table 12.

TABLE 12

| Example No. | 41 | 42 | 43 |
| --- | --- | --- | --- |
| LHSV, h$^{-1}$ | 2 | 4 | 6 |
| $H_2$/Oil volume ratio | 30 | 30 | 30 |

TABLE 12-continued

| Mercaptan sulfur content of product, ppm | 7 | 9 | 8 |
| --- | --- | --- | --- |
| Acid value of product, mg KOH/g | 0 | 0 | 0 |

EXAMPLES 44~47

The following Examples show the activity of the catalyst provided according to the present invention for hydrodemercaptanization and deacidification of light oil distillates.

The activity of catalyst $C_1$ was evaluated with the same feedstocks according to the procedures and conditions of Example 22, except only for different $H_2$/oil volume ratios. The properties of reaction products obtained in different $H_2$/oil volume ratios are shown in Table 13.

TABLE 13

| Example No. | 44 | 45 | 46 | 47 |
| --- | --- | --- | --- | --- |
| $H_2$/Oil volume ratio | 5 | 10 | 15 | 20 |
| Mercaptan sulfur content of product, ppm | 17 | 15 | 13 | 11 |
| Acid value of product, mg KOH/g | 0.009 | 0.008 | 0 | 0 |

EXAMPLES 48~50

The following Examples show the activity of the catalyst provided according to the present invention for hydrodemercaptanization and deacidification of light oil distillates.

The activity of catalyst $C_1$ was evaluated with the same feedstocks according to the procedures and conditions of Example 22, except for different hydrogen sources and ratios of $H_2$/oil. The properties of the reaction products obtained in a $H_2$/oil volume ratio of 30 with different hydrogen sources are shown in Table 14.

TABLE 14

| Example No. | 48 | 49 | 50 |
| --- | --- | --- | --- |
| Hydrogen source | $H_2$ containing 0.5 wt % $H_2S$ | $H_2$ containing 1.5 wt % $H_2S$ | $H_2$ containing 25 vol. % $N_2$ |
| $H_2$/Oil volume ratio | 30 | 30 | 30 |
| Mercaptan sulfur content of product, ppm | 8 | 9 | 9 |
| Acid value of product, mg KOH/g | 0 | 0 | 0 |

EXAMPLES 51~52

The following Examples show the activity of the catalyst provided according to the present invention for hydrodemercaptanization and deacidification of light oil distillates.

The activity of catalyst $C_1$ was evaluated according to the procedures and conditions of Example 22, except for different reaction temperatures. The properties of reaction products obtained at different reaction temperatures are shown in Table 15.

TABLE 15

| Example No. | 51 | 52 |
| --- | --- | --- |
| Reaction temperature, ° C. | 160 | 170 |
| Mercaptan sulfur content of product, ppm | 14 | 13 |
| Acid value of product, mg KOH/g | 0 | 0 |

It can be seen from the results shown in Tables 11~15 that: (1). Applying the catalysts of the present invention, the reaction was carried out under different process conditions, even under very moderate hydrogenation conditions (reaction temperature below 200° C., even below 160° C., and the ratios of $H_2$/oil were not greater than 30), the mercaptan contents and acid values of reaction products all met the quality requirements for #3 jet fuel. (2). At a reaction temperature below 200° C., the activity of the catalyst provided according to the present invention for demercaptanization did not vary obviously with the changing temperature. Referring to the result shown in Tables 5~10, it can be seen that, at high temperature, the catalysts of the prior art demonstrated similar catalytic activities to those of the catalyst of the present invention, but at a reaction temperature below 200° C., their activities for hydrodemercaptanization and deacidification diminished obviously with the descending temperature, and the products did not meet the quality requirements for #3 jet fuel.

EXAMPLES 53~55

The following Examples show the activity of the catalyst provided according to the present invention for hydrodemercaptanization and deacidification of light oil distillates.

The activity of catalyst $C_1$ was evaluated according to the procedures of Example 22, except that #2, #3 and #4 aviation kerosene were used as feedstock oils having different distillation ranges of 162~228° C., 162~220° C. and 147~242° C. respectively as shown in Table 3, and also reaction conditions were different. The reaction conditions and properties of reaction products are shown in Table 16.

TABLE 16

| Example, No. | 53 | 54 | 55 |
|---|---|---|---|
| Feedstock, No. | #2 | #3 | #4 |
| Reaction pressure, MPa | 0.7 | 0.7 | 0.7 |
| Reaction temperature ° C. | 180 | 180 | 180 |
| LHSV $h^{-1}$ | 6.0 | 4.0 | 4.0 |
| $H_2$/Oil volume ratio | 30 | 30 | 30 |
| Mercaptan sulfur content of product, ppm | 12 | 8 | 4 |
| Acid value of product, mg KOH/g | 0 | 0 | 0 |

It can be seen from the results shown in Table 16 that the catalyst provided according to the present invention has a broad flexibility to different oil products.

EXAMPLE 56

The following Example shows the activity stability of the catalyst provided according to the present invention when used for hydrodemercaptanization and deacidification of light oil distillates.

The stability of hydrodemercaptanization and deacidification activity of the catalyst $C_1$ was evaluated in a 100 ml hydrogenation apparatus by using #1 aviation kerosene with distillation range of 161~220° C. as a feedstock. The loading of the catalyst was 100 ml. The reaction conditions were: reaction temperature 240° C., partial pressure of hydrogen 0.7 MPa, LHSV 4.0 $h^{-1}$, and ratio of $H_2$/oil 30. The variation of mercaptan sulfur content and acid value of the reaction product with reaction time are shown in the Table 17. Samples were taken while reaction was carrying on at the 500th, 1000th and 2000th hr for analysis of several properties. The results are shown in Table 18. The test ended at the 2006 hr. The catalyst was removed from the reactor carefully and divided into three parts in equal quantity according to the upper, middle and lower layers of catalyst bed in the reactor. The catalyst from the upper, middle and lower layers in a quantity of 3 g each was taken respectively for analysis of carbon deposit on the catalyst by a CS-344 infrared carbon and sulfur determination meter. The results are shown in Table 21.

TABLE 17

| Reaction Time, hr | Mercaptan sulfur content of formed oil, ppm | Acid value of formed oil, mg KOH/g |
|---|---|---|
| 175 | 3 | 0 |
| 366 | 5 | 0 |
| 558 | 4 | 0 |
| 840 | 7 | 0 |
| 1034 | 6 | 0 |
| 1337 | 7 | 0 |
| 1673 | 5 | 0 |
| 1961 | 5 | 0 |
| 2006 | 5 | 0 |

TABLE 18

| Item | GB6537-94 Quality Standard | #1 feedstock oil | Reaction time hr | | |
|---|---|---|---|---|---|
| | | | 500 | 1000 | 2000 |
| Chroma, No | reported | 19 | 26 | 27 | 27 |
| Acid value, mg KOH/g | ≯0.015 | 0.039 | 0 | 0 | 0 |
| Total sulfur, Wt % | ≯0.20 | 0.217 | 0.188 | 0.180 | 0.168 |
| Mercaptan sulfur content, ppm | ≯20 | 128 | 5 | 7 | 5 |
| Doctor test | (−) | (+) | (−) | (−) | (−) |
| Silver strip corrosion test, (50° C., 4h), Grade | ≯1 | 0 | 0 | 0 | 0 |
| Copper strip corrosion test, (100° C., 4h), Grade | ≯1 | 1a | 1a | 1a | 1a |
| Distillation range, ° C. | | | | | |
| Initial | reported | 161 | 160 | 160 | 159 |
| 10% | ≯205 | 173 | 173 | 172 | 172 |
| 50% | ≯232 | 186 | 186 | 187 | 186 |
| 90% | reported | 207 | 205 | 205 | 204 |
| End point | ≯300 | 220 | 220 | 221 | 220 |

EXAMPLE 57

The following Example show the activity stability of the catalyst provided according to the present invention for hydrodemercaptanization and deacidification of light oil distillates.

The evaluation of activity was carried out with same feedstocks according to procedures of Example 56, except for the reaction temperature of 180° C. The variation of the mercaptan sulfur content and acid value of the reaction product with reaction time are shown in Table 19. Samples were taken while reaction was carrying on at the 500th, 1000th and 2000th hr for analysis of several properties. The results are shown in Table 20. The analysis of carbon deposit was carried out by the same method as Example 55, and the results are shown in Table 21.

TABLE 19

| Reaction Time, hr | Mercaptan sulfur content of formed oil, ppm | Acid value of formed oil, mg KOH/g |
|---|---|---|
| 128 | 12 | 0 |
| 246 | 13 | 0 |
| 300 | 11 | 0 |
| 508 | 12 | 0 |
| 705 | 11 | 0 |
| 1506 | 11 | 0 |

TABLE 19-continued

| Reaction Time, hr | Mercaptan sulfur content of formed oil, ppm | Acid value of formed oil, mg KOH/g |
|---|---|---|
| 1750 | 11 | 0 |
| 2006 | 11 | 0 |

TABLE 20

| Item | GB6537-94 Quality Standard | #1 feedstock oil | Reaction time, hr | | |
|---|---|---|---|---|---|
| | | | 500 | 1000 | 2000 |
| Chroma, No | reported | 19 | 26 | 27 | 27 |
| Acid value, mg KOH/g | ≯0.015 | 0.039 | 0 | 0 | 0 |
| Total sulfur content, wt % | ≯0.20 | 0.217 | 0.185 | 0.183 | 0.175 |
| Mercaptan sulfur content, ppm | ≯20 | 128 | 13 | 11 | 11 |
| Doctor test | (−) | (+) | (−) | (−) | (−) |
| Silver strip corrosion test, (50° C., 4h), Grade | ≯1 | 0 | 0 | 0 | 0 |
| Copper strip corrosion test, (100° C., 4h), Grade | ≯1 | 1a | 1a | 1a | 1a |
| Distillation range, ° C. | | | | | |
| Initial | reported | 161 | 160 | 160 | 161 |
| 10% | ≯205 | 173 | 173 | 172 | 172 |
| 50% | ≯232 | 186 | 186 | 185 | 186 |
| 90% | reported | 207 | 205 | 206 | 206 |
| End point | ≯300 | 220 | 220 | 220 | 221 |

TABLE 21

| Catalyst position in reactor | upper | middle | lower | Average |
|---|---|---|---|---|
| Amount of carbon deposit in the Catalyst of Ex. 56, wt % | 6.58 | 5.87 | 5.03 | 5.83 |
| Amount of carbon deposit in the Catalyst of Ex. 57, wt % | 6.15 | 5.63 | 4.87 | 5.55 |

The results shown in Tables 17~21 indicate that the catalyst provided according to the present invention has not only excellent activity, but also very good activity stability, and the properties of all the reaction products obtained can meet the quality requirements for #3 aviation fuel. More unexpectedly, the stability of demercaptanization activity at low temperature of the catalyst according to the invention is also very high, furthermore, the analysis of carbon deposit on the catalyst provided according to the present invention showed that the carbon deposit at lower temperature was lower than that at high temperature, indicating that the catalyst provided according to the invention can be run at lower temperature for longer operation period.

We claim:

1. A hydrotreating catalyst containing molybdenum and/or tungsten for light oil distillates, comprising tungsten oxide and/or molybdenum oxide, nickel oxide and cobalt oxide supported on an alumina carrier, wherein, on the basis of the catalyst, the content of said tungsten oxide and/or molybdenum oxide is from 4 wt % to less than 10 wt %, the content of nickel oxide 1~5 wt %, the content of cobalt oxide 0.01~1 wt %, and the ratio of the total atom number of nickel and cobalt to the total atom number of nickel, cobalt, tungsten and/or molybdenum is 0.3~0.9.

2. The catalyst according to claim 1, wherein the content of said nickel oxide is 2~4 wt %.

3. The catalyst according to claim 2, wherein the content of said cobalt oxide is 0.02~0.5 % wt.

4. The catalyst according to claim 1, wherein the content of said tungsten oxide and/or molybdenum oxide is 4.5~9 wt %.

5. The catalyst according to claim 2, wherein said ratio of the total atom number of nickel and cobalt to the total atom number of nickel, cobalt, tungsten and/or molybdenum is 0.4~0.7.

6. The catalyst according to any one of claims 1~5, wherein said catalyst comprises further a promoter, said promoter is selected from magnesium, fluorine or phosphorus, the content of said promoter is 0.1~8 wt %, based on element.

7. The catalyst according to claim 6, wherein the content of said promoter is 0.2~5 wt %.

8. The catalyst according to claim 1, wherein said alumina carrier is γ-alumina, η-alumina or mixture thereof.

9. The catalyst according to claim 1, wherein said alumina carrier is γ-alumina or an alumina being substantially comprised of γ-alumina.

10. A preparation method of the catalyst according to claim 1 comprising impregnation of alumina carrier with an aqueous solution containing a molybdenum and/or tungsten compound and a nickel compound and an aqueous solution containing a cobalt compound, and calcination of the alumina carrier on which molybdenum and/or tungsten, nickel and cobalt have been impregnated, wherein said process of the impregnation of said alumina carrier with said aqueous solution containing cobalt compound and said process of the impregnation of alumina carrier with said aqueous solution of the molybdenum and/or tungsten compounds and nickel compound are carried out separately, and that said process of impregnation of the alumina carrier with said aqueous solution containing cobalt compound is carried out after the alumina carrier has been impregnated with said aqueous solution of the molybdenum and/or tungsten compounds and nickel compound and calcined, and that said calcination of the alumina carrier impregnated with the aqueous solution containing cobalt compound is carried out at a temperature of 50~300° C. for more than 1 hour.

11. The method according to claim 10, wherein said tungsten compound is ammonium tungstate and/or ammonium metatungstate, said molybdenum compound is ammonium molybdate, said nickel compound is nickel nitrate and/or nickel acetate, and said cobalt compound is cobalt nitrate and/or cobalt acetate.

12. The method according to claim 10, wherein said calcination temperature of said alumina carrier impregnated with said aqueous solution containing cobalt compound is 150~250° C., and said calcination time is 2~4 hours.

13. The method according to claim 10, wherein said method comprises further a step of impregnating the alumina carrier with an aqueous solution of one or more magnesium-, phosphorus- or fluorine-containing compounds, said impregnation is carried out before the alumina carrier is impregnated with an aqueous solution containing molybdenum and/or tungsten compounds and nickel compound.

14. The method according to claim 13, wherein said magnesium compound is magnesium nitrate, said fluorine compound is ammonium fluoride and/or fluohydric acid, said phosphor compound is selected from one or more of phosphoric acid, ammonium phosphate, ammonium hydrogen phosphate and ammonium dihydrogen phosphate.

15. A hydrotreating catalyst containing molybdenum and/or tungsten for light oil distillates comprising tungsten oxide and/or molybdenum oxide, nickel oxide and cobalt oxide, wherein, based on the catalyst, the content of said tungsten oxide and/or molybdenum oxide is from 4 wt % to less than 10 wt %, the content of nickel oxide 1~5 wt %, the content of cobalt oxide 0.01~1 wt %, and the ratio of the total atom number of nickel and cobalt to the total atom number of nickel, cobalt, tungsten and/or molybdenum is 0.3~0.9; the preparation method of said catalyst comprises impregnation of alumina carrier with an aqueous solution containing molybdenum and/or tungsten compounds and a nickel compound, and an aqueous solution containing cobalt compound, and calcination of the alumina carrier on which molybdenum and/or tungsten, nickel and cobalt have been impregnated; said process of the impregnation of alumina carrier with said aqueous solution containing cobalt compound and said process of the impregnation of alumina carrier with said aqueous solution of tungsten and/or molybdenum compound and nickel compound are carried out separately; said process of the impregnation of the alumina carrier with said aqueous solution containing cobalt compound is carried out after the alumina carrier has been impregnated with said aqueous solution of molybdenum and/or tungsten compound and nickel compound and then has been calcined; said calcination temperature of the alumina carrier impregnated with said aqueous solution containing cobalt compound is 50~300° C., and said calcination time is more than 1 hour.

16. The catalyst according to claim 15, wherein said calcination temperature of the alumina carrier impregnated with the aqueous solution containing cobalt compound is 150~250° C., and said calcination time is 2~4 hours.

* * * * *